Patented May 12, 1931

1,804,631

UNITED STATES PATENT OFFICE

RALPH H. McKEE, OF NEW YORK, N. Y., ASSIGNOR TO TENNESSEE CORPORATION, A CORPORATION OF NEW YORK

MANUFACTURE OF SULPHATES

No Drawing.   Application filed November 1, 1924. Serial No. 747,391.

This invention relates to the manufacture of sulphates, and more particularly to the recovery of sulphates from potassium aluminous minerals, such as sericite, micacious shist, and in particular, certain slates such as are found in Georgia which have a high content of sericite.

It has heretofore been attempted to recover from these minerals, and similar minerals, the potash and alumina in a soluble form by various furnacing operations, as set forth in my prior Patents Nos. 869,011 and 1,222,960. The recovery of the potassium and alumina by treatment with strong acids at elevated temperatures has also been attempted and other means for obtaining these minerals have also been employed. For various reasons, the different processes have not been entirely satisfactory and have not come into extensive use.

In the present invention, the mineral from which the potassium and alumina are to be recovered is treated with diluted sulfuric acid of about 34° Baumé (40 per cent.). I have found that while strong sulfuric acid of from 80 per cent. to 90 per cent. strength reacts incompletely and slowly with such potassium aluminous minerals, even at elevated temperatures and even when the minerals are finely ground, dilute sulfuric acid of the character referred to above reacts at lower temperatures and at higher speeds, producing large yields of soluble sulphates. A further advantage of the use of the diluted acid is the fact that the mineral does not have to be finely ground. As a general rule, grinding to 20 to 30 mesh is sufficient. Finer grinding may be resorted to if desired but is objected to because of the increased cost.

After the material has been treated with the acid preferably at a temperature of 100 to 115° C., the filtrate is removed and cooled and the mush of crystals of potash alum, aluminum sulphate and iron sulphate filtered off. A strong acid is then added to the filtrate and aluminum sulphate and ferric sulphate separated by precipitation. The original precipitate is then reworked to recover the potash alum and the second precipitate is treated to recover the iron and aluminum sulphates.

In a typical embodiment of the invention, sulfuric acid is diluted to about 40 per cent. strength and run into an acid proof tank having a false filter bottom. While an acid of about 40 per cent. strength is preferably used, I find that the strength of the acid may be varied from 30 per cent. to 60 per cent. without materially affecting the performance of the process. Georgia slate, such as that found in the Cartersville area, or other potassium aluminous mineral is ground to about 30 mesh and gradually added to the diluted acid. The gradual addition is for the purpose of permitting every particle of the slate to become thoroughly wet with the diluted acid. As an alternative, the slate may be rapidly added or dumped into the acid and subsequently stirred. The reaction between the acid and the slate ordinarily will start of itself. If necessary, however, the reaction may be started by blowing steam into the portion of the mass near the bottom of the tank. The reaction is strongly exothermic and when once started, will require no additional heat to maintain the mass at the boiling point of the solution. The reaction will normally complete itself in less than 24 hours.

When the reaction is complete, the outlet below the false bottom is opened and the hot solution drawn off, placed in a tank and cooled. The residue is washed with hot water and the wash water is kept separate from the strong filtrate. The waste residue is largely silica but may contain some slate and other mineral matter which has not been acted on by the acid. The filtrate is then cooled, preferably by blowing air through the solution, and the mush of crystals of potash alum, aluminum sulphate and iron sulphate filtered off. The blowing of air through the solution is preferably employed for cooling, as this causes the salts to crystallize out in a more readily filterable condition. The filtrate is then strengthened with a strong acid and the whole allowed to stand over night. Ferric sulphate and aluminum sulphate are thus precipitated and the filtrate obtained is diluted with the solution from the wash water tank to give the desired 40 per cent. strength of acid for use in a new run.

The first precipitate of potash alum, aluminum sulphate and iron sulphate is washed with a little cold water or saturated aluminum sulphate solution and then dissolved in a minimum of hot water. This solution is filtered hot and cooled. The potash alum salt then crystallizes out and may be filtered off and sold as such. The potash alum may also be roasted to give potassium sulphate and alumina and the gases from the roasting will contain sulfur dioxid and sulfur trioxid, which may be recovered as sulfuric acid. The solution may be further cooled to precipitate the aluminum sulphate and drying and roasting of this precipitate may be resorted to to obtain alumina and roasting gases containing sulfur dioxid and sulfur trioxid. If desired, the potassium alum and the aluminum sulphate may be roasted together. When the process is performed in this manner, the potassium sulphate is separated from the alumina by leaching with hot water and by evaporating. The alumina after washing and drying, is ready for the market.

The iron and aluminum sulphates in the second precipitate, and in the filtrate from the crystallized aluminum sulphate, are separated by drying the mixture and roasting at from 475° to 500° C. This will decompose the iron sulfate, forming iron oxid, but will scarcely affect the aluminum sulphate. The roast gases are treated for the recovery of the sulfur dioxid and sulfur trioxid content. The roasted mass is leached with hot water to recover the residue of ferric oxid. The hot water solution of aluminum sulphate is then evaporated and solidified or may be dried and roasted to obtain alumina.

In place of the differential roasting process for separating the iron from the aluminum, the iron may be precipitated from the mixed solution by known methods and the iron free filtrate then worked up for its content of aluminum sulphate.

By the term "diluted surfuric acid" as employed in the claims is meant an acid of such a strength as would be obtained by diluting commercial sulfuric acid as made by the lead chamber process and concentrated in a Glover tower. Since commercial sulfuric acid so prepared is of approximately 60° Baumé and contains about 78 per cent. of $H_2SO_4$ it is apparent that the term "diluted sulphuric acid" contemplates a product which is of less than 60° Baumé and contains less than 78 per cent. of $H_2SO_4$, and as is set forth above, the acid which I prefer to employ contains from 30 to 60 per cent. of $H_2SO_4$.

While I have described in detail the preferred practice of my process, it is to be understood that the details of procedure may be widely varied without departing from the spirit of the invention or the scope of the subjoined claims.

I claim:

1. The process of recovering potassium sulphate and aluminum sulphate from potassium and aluminum bearing sericitic silicates which comprises treating such silicates in coarsely ground condition with sulfuric acid of from 30 to 60 per cent. strength.

2. The process of recovering potassium sulphate and aluminum sulphate from potassium and aluminum bearing sericitic minerals which comprises grinding such minerals to approximately 20 to 30 mesh, and treating the ground material with diluted sulfuric acid.

3. The process of recovering potassium sulphate and aluminum sulphate from potassium and aluminum bearing sericitic minerals which comprises grinding such minerals to approximately 20 to 30 mesh, and treating the ground material with sulfuric acid of from 30 to 60 per cent. strength.

In testimony whereof, I affix my signature.

RALPH H. McKEE.